(No Model.)

H. D. DUNBAR.
PISTON VALVE.

No. 504,153. Patented Aug. 29, 1893.

Witnesses:
R. Schleicher
F. D. Goodwin

Inventor:
Henry D. Dunbar
by his Attorneys
Howson & Howson

UNITED STATES PATENT OFFICE.

HENRY D. DUNBAR, OF NORTH HARTLAND, VERMONT.

PISTON-VALVE.

SPECIFICATION forming part of Letters Patent No. 504,153, dated August 29, 1893.

Application filed May 6, 1893. Serial No. 473,289. (No model.)

*To all whom it may concern:*

Be it known that I, HENRY D. DUNBAR, a citizen of the United States, and a resident of North Hartland, Windsor county, Vermont, have invented certain Improvements in Piston-Valves for Steam-Engines, of which the following is a specification.

One object of my invention is to so construct a piston valve for steam engines as to permit of the escape of water of condensation from either end of the cylinder through said valve when the latter is adjusted so as to close the port communicating with said end of the cylinder before the completion of the stroke.

A further object is to so connect the operating rod to a piston valve as to provide for slight lateral play of the valve or rod independently of each other in order to render unnecessary the extreme care in fitting which is demanded and to obviate the binding which is likely to occur when the valve rod and valve are rigidly secured together.

Figure 1:
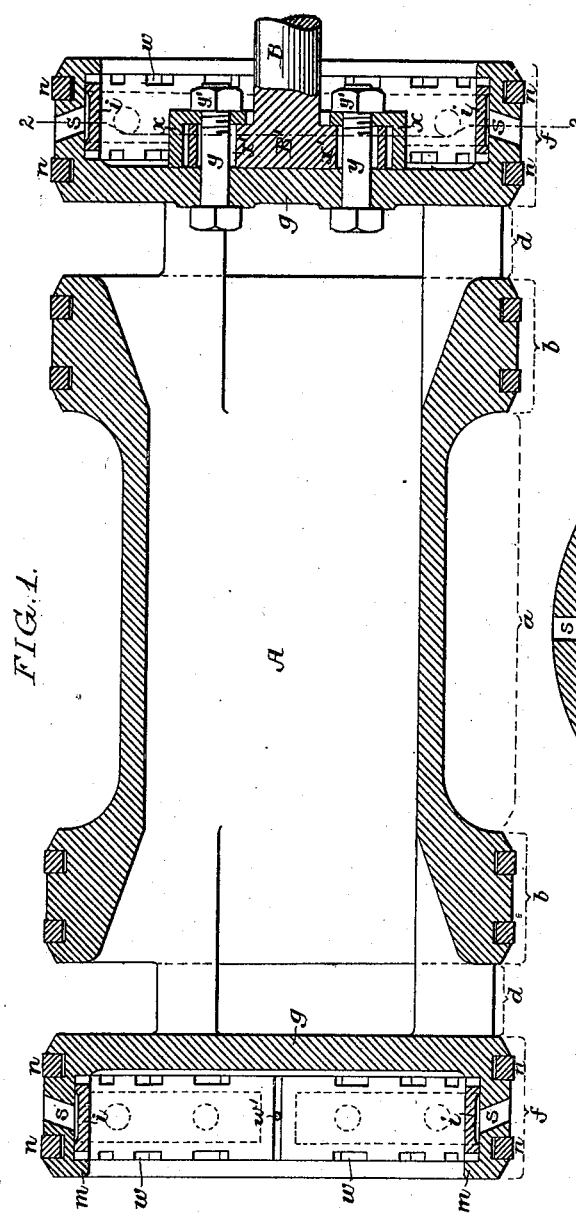
Figure 2:
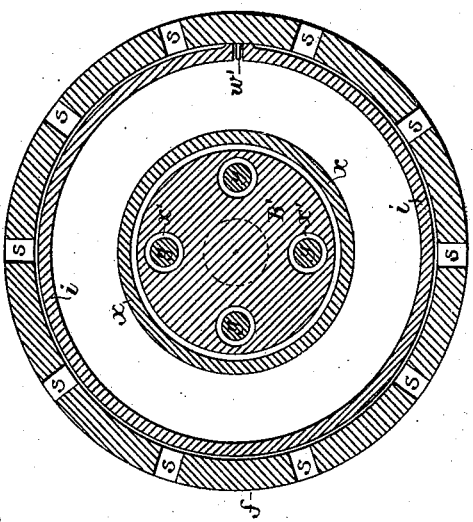

In the accompanying drawings:—Figure 1, is a longitudinal sectional view of a piston valve with my improvements; and Fig. 2, is a transverse section on the line 2—2, Fig. 1.

I have represented for the purpose of illustrating my invention, a valve of the Vauclain type, but it should be understood that my invention is applicable to piston valves generally in which similar conditions are met. The valve shown comprises the tubular central portion A having an annular exhaust chamber $a$ and packed rings $b$ for separating said exhaust chamber from the ports $d$, through which, and through the valve, steam from either end of the high pressure cylinder is exhausted into the opposite end of the low pressure cylinder. Beyond the ports $d$ at the ends of the valve are packed rings $f$ which serve to alternately open and close the live steam ports leading to the high pressure cylinder, it being understood that steam enters the opposite ends of the valve chest through suitable inlet ports, and is prevented from gaining access to the hollow body of the valve by means of the opposite heads or partitions $g$ of the same. The necessary movement of the valve causes the closing of the steam induction and eduction ports at each end of the cylinder some little time before the piston reaches the end of its stroke toward that end. Consequently if water of condensation is present in any considerable volume in the cylinder, this water is prevented from escaping between the piston and cylinder head and consequently either injures said head or the piston connections, or so strains the bolts which secure the head as to cause a leaky joint.

The end rings $f$ of the valve are recessed in order to lighten the valve, and in carrying out my invention I apply to said recessed rings of the valve, internal pressure relieving valve rings $i$ which are split so as to be elastic and have an inherent tendency to expand, so that the pressure of steam in the ends of the valve box or chest will press these rings firmly outward against their seats in the recessed ends of the valve, each ring being confined longitudinally in place between the partition or head $g$ and an inwardly projecting flange $m$ at the end of the valve.

In that portion of each ring $f$ between the packing rings $n$ of the same are formed openings $s$, so that steam or water can flow from the end of the cylinder through these openings and into a groove or recess extending circumferentially almost entirely throughout the extent of the ring $i$, the area of this groove or recess being less than the area of the inner face of said ring $i$ exposed to the pressure of steam in the chest, so that while normally the ring $i$ will be held firmly against its seat, and any escape of steam from the end of the cylinder when the port is closed will be prevented, water which accumulates in the end of the cylinder will, when subjected to the pressure of the piston, exert sufficient force upon the lesser area exposed by the groove of the ring $i$ to overcome the pressure of steam against the inner face of said ring and the latter will be forced to yield inwardly so as to permit the water to escape between the outer face of the ring and its seat and thence through the notches $w$ in the edges of the ring into the valve chest, from which it will flow into the steam passages where its presence is not injurious. A dowel pin, such for instance as shown at $w'$, or some other equivalent means may be employed to prevent the ring $i$ from rotating.

It will be evident that the notches for the escape of the water may be formed in the partition $g$ or flange $m$ of the valve instead of in the ring if desired, this construction being the equivalent of that shown.

The valve stem or rod B has at the inner end an enlarged head B', which is confined to the head or partition g of the valve by means of a cap x which is seated upon said partition and bears lightly upon the outer face of the head B' of the valve stem, this cap being secured in place by a series of bolts y and nuts y', the bolts passing through enlarged openings x' in the head of the valve stem, so that while the latter is properly confined to the valve in a longitudinal direction it can move laterally to a limited extent independently of the valve. Hence the fitting of the parts is very materially facilitated, since an absolutely correct alignment of valve and valve stem is not demanded, and binding of either the valve or stem is prevented.

If desired, the securing bolts for the cap x may be beyond the limits of the head B', in which case, of course, the formation of openings in said head will be unnecessary, and in some cases the front and rear faces of the head B' may be slightly convex so as to permit a certain amount of rocking movement in the connection of the valve and rod.

Having thus described my invention, I claim and desire to secure by Letters Patent—

1. A piston valve for steam engines, provided with a recessed and perforated ring for closing the steam port of the cylinder, and a split relief ring, applied to said recessed ring of the valve and serving to close the perforations of the same, substantially as specified.

2. A piston valve for steam engines having a ring for closing the steam port of the cylinder, in combination with a notched relief ring adapted to a recessed portion of said valve ring and confined longitudinally between shoulders on the latter, the valve ring having openings through which pressure in the cylinder can act to compress the relief ring, substantially as specified.

3. A piston valve for steam engines having a recessed and perforated ring for closing the steam port of the cylinder, and a split relief ring applied to said recessed ring of the valve, and serving to close the perforations of the same, said relief ring having an external groove extending partway throughout the same, substantially as specified.

4. The combination of a piston valve, with a valve stem having an enlarged head, and a detachable cap secured to the valve and serving to confine the head of the valve stem lightly thereto, but permitting lateral play of the valve stem on the valve, substantially as specified.

5. The combination of a piston valve, with a valve rod having an enlarged head, and a cap seated upon a bearing on the valve and lightly confining the head of the valve rod, and securing bolts for said cap passing through elongated openings in the said head of the valve rod, substantially as specified.

In testimony whereof I have signed my name to this specification in the presence of two subscribing witnesses.

HENRY D. DUNBAR.

Witnesses:
H. F. REARDON,
FRANK EDMUND BECHTOLD.